(12) United States Patent
Inui

(10) Patent No.: US 7,126,714 B1
(45) Date of Patent: Oct. 24, 2006

(54) METHOD AND APPARATUS FOR PRINTING CONTENTS CARRIED ON BROADCAST SIGNALS

(75) Inventor: Fuyuki Inui, Saitama (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 974 days.

(21) Appl. No.: 09/709,513

(22) Filed: Nov. 13, 2000

(30) Foreign Application Priority Data

Nov. 10, 1999 (JP) .................................. 11-320295

(51) Int. Cl.
*G06F 15/00* (2006.01)

(52) U.S. Cl. ............... 358/1.16; 358/1.15; 358/296; 348/460; 348/465; 348/467; 348/468; 348/473; 725/24

(58) Field of Classification Search ............... 358/1.16, 358/1.15; 725/24; 348/460, 465, 467, 468, 348/473

See application file for complete search history.

(56) References Cited

U.S. PATENT DOCUMENTS

| | | | | |
|---|---|---|---|---|
| 5,488,423 A | * | 1/1996 | Walkingshaw et al. | 725/24 |
| 5,940,582 A | * | 8/1999 | Akabori et al. | 358/1.13 |
| 6,195,170 B1 | * | 2/2001 | Mizutani et al. | 358/1.14 |
| 6,433,884 B1 | * | 8/2002 | Kawakami | 358/1.15 |
| 6,476,933 B1 | * | 11/2002 | Honma | 358/1.9 |
| 6,600,569 B1 | * | 7/2003 | Osada et al. | 358/1.12 |
| 6,747,753 B1 | * | 6/2004 | Yamamoto | 358/1.15 |

FOREIGN PATENT DOCUMENTS

| | | | |
|---|---|---|---|
| JP | 05-75984 | | 3/1993 |
| JP | 07-170473 | | 7/1995 |
| JP | 08-116520 | | 5/1996 |
| JP | 09-214904 | | 8/1997 |
| JP | 09298720 A | * | 11/1997 |
| JP | 10-164521 | | 6/1998 |
| JP | 11237966 A | * | 8/1999 |

* cited by examiner

*Primary Examiner*—Joseph R. Pokrzywa
*Assistant Examiner*—Mark R. Milia
(74) *Attorney, Agent, or Firm*—Sughrue Mion, PLLC

(57) ABSTRACT

A printing apparatus for printing out contents carried on broadcast signals onto paper, which comprises a receiving unit for receiving the broadcast signals; a detecting unit for detecting designated contents, which are designated for printing, from contents carried on the broadcast signals received by the receiving unit; and a printing unit for printing out the designated contents detected by the detecting unit onto paper.

10 Claims, 6 Drawing Sheets

| CATEGORY CODE 1 | CATEGORY CODE 2 | · · · · · · | NUMBER OF PRINTS |
|---|---|---|---|
| RECIPE | JAPANESE | · · · · · · | 45 |
| RECIPE | WESTERN | · · · · · · | 25 |
| RECIPE | CHINESE | · · · · · · | 31 |
| ADDRESS | GIFTS | · · · · · · | 50 |
| ADDRESS | QUESTIONNAIRES | · · · · · · | 5 |
| · · · · | · · · · | · · · · | · · · · |

*FIG. 6*

METHOD AND APPARATUS FOR PRINTING CONTENTS CARRIED ON BROADCAST SIGNALS

This patent application claims priority from a Japanese patent application No. H11-320295 filed on Nov. 10, 1999, the contents of which are incorporated herein by reference.

BACKGROUND OF THE INVENTION

1. Field of the Invention

The present invention relates to a printing method and a printing apparatus. More particularly, the present invention relates to a printing apparatus for printing contents carried on broadcast signals.

2. Description of the Related Art

Sometimes people want to print out a screen image onto paper when a TV program shows a cooking recipe or an address to apply for a gift, for example. The Japanese Patent Application Laid-Open No. 10-164521 discloses a conventional art for printing out a screen image from TV onto paper.

However, the conventional art described in the Japanese Patent Application Laid-Out No. 10-164521 is disadvantageous in that screen images that a user does not want may be printed out.

SUMMARY OF THE INVENTION

Therefore, it is an object of the present invention to provide a method and apparatus for printing contents carried on broadcast signals, which is capable of overcoming the above drawbacks accompanying the conventional art. Combinations described in the independent claims achieve this object. The dependent claims define further advantageous and exemplary combinations of the present invention.

According to the first aspect of the present invention, a printing apparatus for printing out contents carried on broadcast signals onto paper includes a receiving unit for receiving the broadcast signals; a detecting unit for detecting contents designated for printing from the contents carried on the broadcast signals received by the receiving unit; and a printing unit for printing out onto paper, the designated contents detected by the detecting unit. For example, broadcast signals are signals for simultaneously transmitting pictures to many receiving devices such as televisions, such as television signals for sending pictures in analog or digital form. For example, the contents may be image information or character information. Character information may be for example, character information described by a text format such as SGML or standard generalized markup language, HTML or hypertext markup language, and XML or extensible markup language. The receiving device may be, for example, a TV tuner and may retrieve television signals of given channels from among the waves received by aerials. The printing unit may be, for example, a printer of the optical fixing type direct thermal recording system for printing out contents onto thermal recording medium, an inkjet printer, a thermal transfer printer, and a dye sublimation printer.

According to an arrangement of the first aspect of the present invention, the printing apparatus may further include a print judging unit for instructing the printing unit to print the designated contents when a print designation code for designating the category of the pre-stored designated contents coincides with a category code for specifying the category of the designated contents carried on the broadcast signals. For example, the print judging unit may be a control unit for controlling the printing apparatus and may be achieved by a programmed CPU.

Further, the printing apparatus may further include a quantity detecting unit for detecting the quantity of paper carried on the printing apparatus, and the print judging unit stores a plurality of the print designation codes, which are respectively listed in order of priority. Then, the print judging unit instructs the printing unit to print the designated contents with a high priority when the quantity of paper reaches a predetermined quantity.

Furthermore, the printing apparatus may further include the quantity detecting unit for detecting the quantity of paper carried on the printing apparatus, and a storage unit for storing the data of the designated contents. The print judging unit stores the data of the designated contents in the storage unit when paper becomes unavailable.

Moreover, the broadcast signals may include a category code for specifying the category of the designated contents, and the print judging unit may store the category code of the designated contents in association with the frequency that the designated contents of the category code were printed. Then, the print judging unit may instruct the printing unit to print the designated contents of the category code with a high frequency.

Still further, the printing apparatus may print out onto paper, the designated contents and information relating to the designated contents. The detecting unit may also detect whether or not a signal for print designation is carried on a vertical blanking interval of the broadcast signals.

Additionally, the printing apparatus may further include a control unit for combining information showing the contents of the designated contents in the designated contents, and the printing unit prints out an image, which is combined by the control unit with information showing the contents of the designated contents.

Furthermore, the printing apparatus may further include a storage unit for storing designated contents detected by the detecting unit, and a control unit for reading out and instructing a display to display the designated contents stored in the storage unit, as well as instructing the printing apparatus to print selected contents when at least one of the displayed image is selected by a user.

Furthermore, the storage unit may be a video tape recording device, which records the designated contents on a video tape. The broadcast signals may also be television signals.

According to the second aspect of the present invention, a broadcast signal generator for generating the broadcast signals may include a print request signal placing unit for adding to broadcasting data a signal for requesting to a printing apparatus into which the broadcast signals are input, printing of designated contents carried on the broadcast signals.

According to the third aspect of the present invention, a method for printing out designated contents carried on broadcast signals onto paper may include a step of detecting a signal for designating for printing the designated contents carried on the broadcast signals. If the signal is detected in the detecting process, the printing apparatus prints the designated contents onto paper.

Further, the printing method may further include a step of instructing the printing process to print the designated contents when a category code for specifying the category of the designated contents, carried on the broadcast signals, coincides with a print designation code designated previously.

Furthermore, a priority order of printing is determined for each of a plurality of print designation codes, and may further include a step of detecting the quantity of paper carried on a printing apparatus. The judging process instructs the printing unit to print the designated contents with a high order of priority when the quantity of paper reaches a predetermined quantity.

Additionally, the printing method may further include a step of detecting the quantity of paper carried on a printing apparatus, and storing data of the designated contents. The print judging may store data of the designated contents in the storing process when paper becomes unavailable.

Moreover, the broadcast signals may include the category code for specifying the category of the designated contents, and the printing method may further include a step of storing the category code of the designated contents printed in the printing process by associating with the number of times the designated contents of the category code were printed, and instructing the printing process to print the designated contents of the category code having a high frequency.

Further, the printing process may print the designated contents and information relating to the designated contents. Moreover, the detecting process may detect whether or not a signal for designating printing is carried on a vertical blanking interval of the broadcast signal.

The summary of the invention does not necessarily describe all necessary features of the present invention. The present invention may also be a sub-combination of the features described above. The above and other features and advantages of the present invention will become more apparent from the following description of the embodiments taken in conjunction with the accompanying drawings.

BRIEF DESCRIPTION OF THE DRAWINGS

FIG. 6 shows the category codes that a user designated for printing and the frequency the category codes was printed.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

Figure 1:
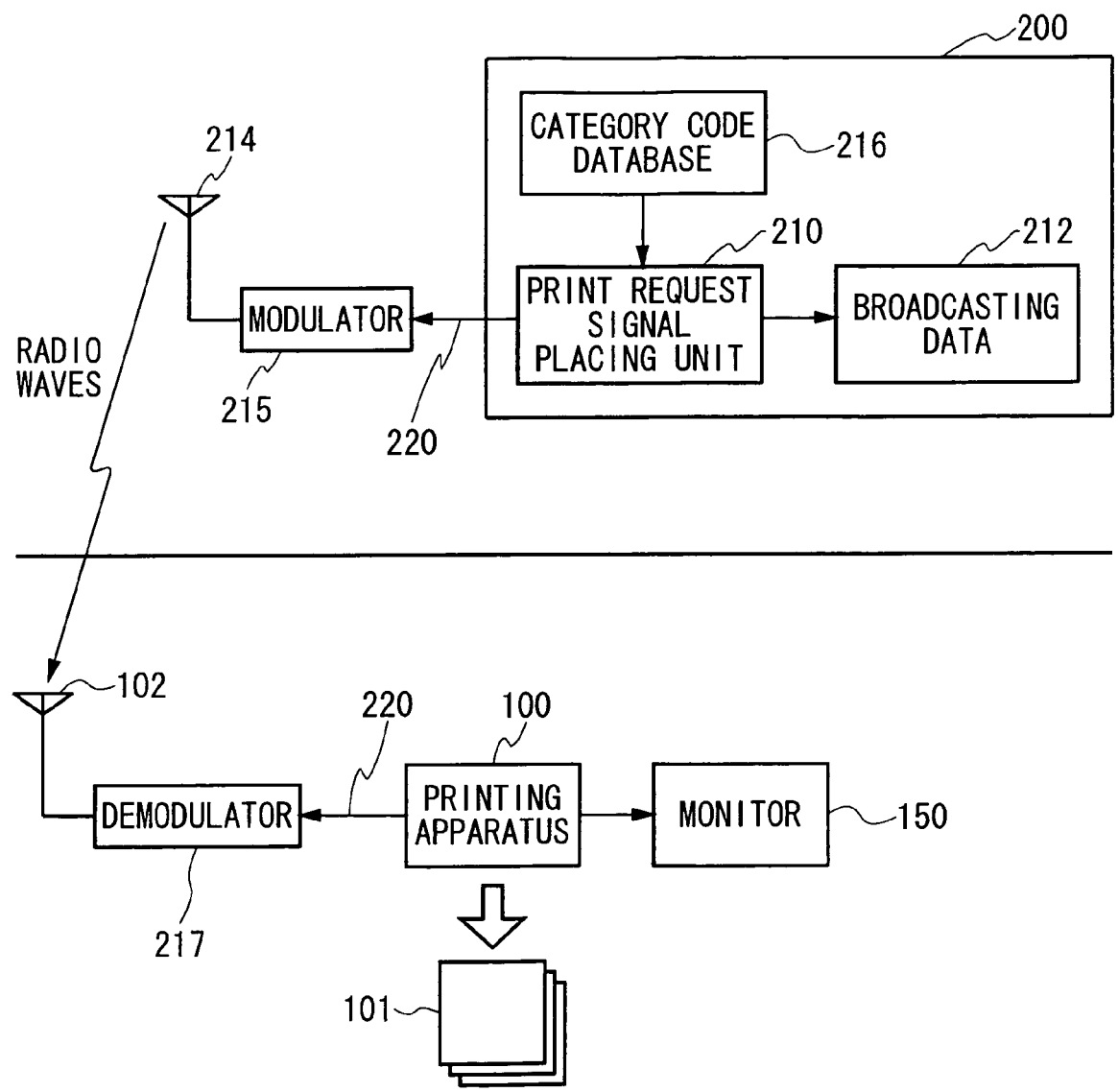
FIG. 1 is a schematic block diagram of an entire system according to an embodiment of the invention.

FIG. 1 is a schematic block diagram of an entire system according to an embodiment of the invention. The system includes a broadcast signal generator 200, a modulator 215, aerials 214 and 102, a demodulator 217, a printing apparatus 100, and a monitor 150. The broadcast signal generator 200 is provided with a print request signal placing unit 210 and a category code database 216. The print request signal placing unit 210 places a print request signal for requesting printing to broadcasting data 212. The broadcasting data 212 may be, for example, contents including image information or character information, which is output from image playback equipment for outputting image data stored in a picture-taking apparatus such as a video camera and a digital camera, or a recording media such as video tape. For example, character information may be character information described in a text format such as SGML or standard generalized markup language, HTML or hypertext markup language, and XML or extensible markup language.

Further, the print request signal placing unit 210 places a category code specifying the category of an image, to broadcasting data 212, based on the category code database 216. For example, the category code is a code showing a category of an image such as a cooking recipe and an application address. The print request signal placing unit 210 places a print request signal to the broadcasting data 212 and outputs a broadcast signal 220 to the modulator 215. The modulator 215 modulates the broadcast signal 220 into an RF signal, or a radio frequency signal, and outputs the RF signal to the aerial 214. The aerial 214 modulates the broadcast signal 220 and transmits the RF signal.

The aerial 102 receives the RF signal and outputs to the demodulator 217. The demodulator 217 demodulates the RF signal received from the aerial 102 and outputs the demodulated signal to the printing apparatus 100. The printing apparatus 100 prints out onto paper, the image carried on the broadcast signal 220 based on the print request signal and the category code, carried on the broadcast signal 220, and outputs printed paper 101. The monitor 150 continuously displays the images carried on the broadcast signals 220.

Figure 2A:
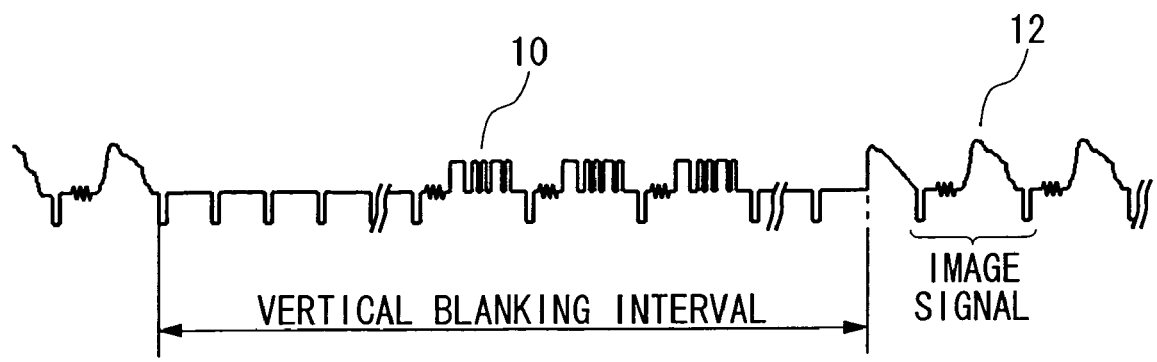
FIGS. 2A–2B show waveforms of a part of a broadcast signal 220.

FIG. 2A shows waveforms of a part of a broadcast signal 220. In the broadcast signal 220, additional information 10 is placed to given horizontal scanning intervals in a vertical blanking interval. The given horizontal scanning intervals are provided in a decree of the Ministry of Posts and Telecommunications of Japan called "The Standard System of Transmission Regarding Television Text Broadcasting." For example, the intervals where the additional information 10 can be placed in the first field forming a screen image are the 14th, 15th, 16th and 21st horizontal scanning intervals, counted in the order of the horizontal scanning interval numbers. Therefore, the print request signal placing unit 210 shown in FIG. 1 places a print request signal and a category code, for example, to the additional information 10.

Figure 2B:
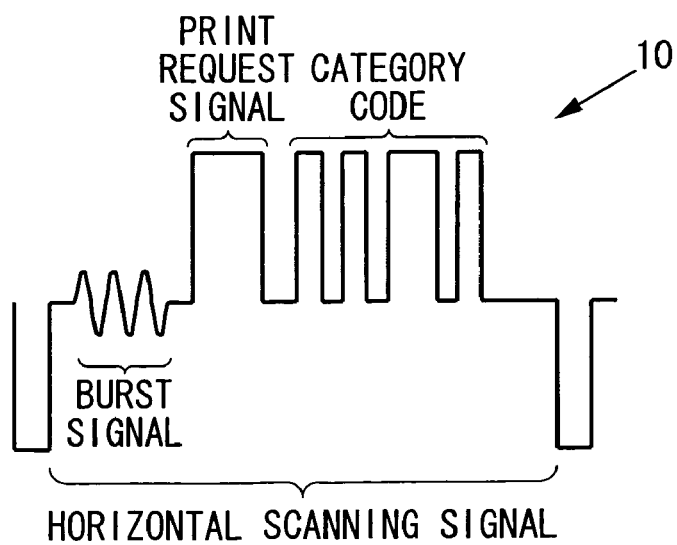

FIG. 2B shows the horizontal scanning intervals where the additional information 10 is placed. The broadcast signal generator 200 shown in FIG. 1 places a print request signal and a category code as the additional information 10, to the horizontal scanning intervals.

Figure 3:
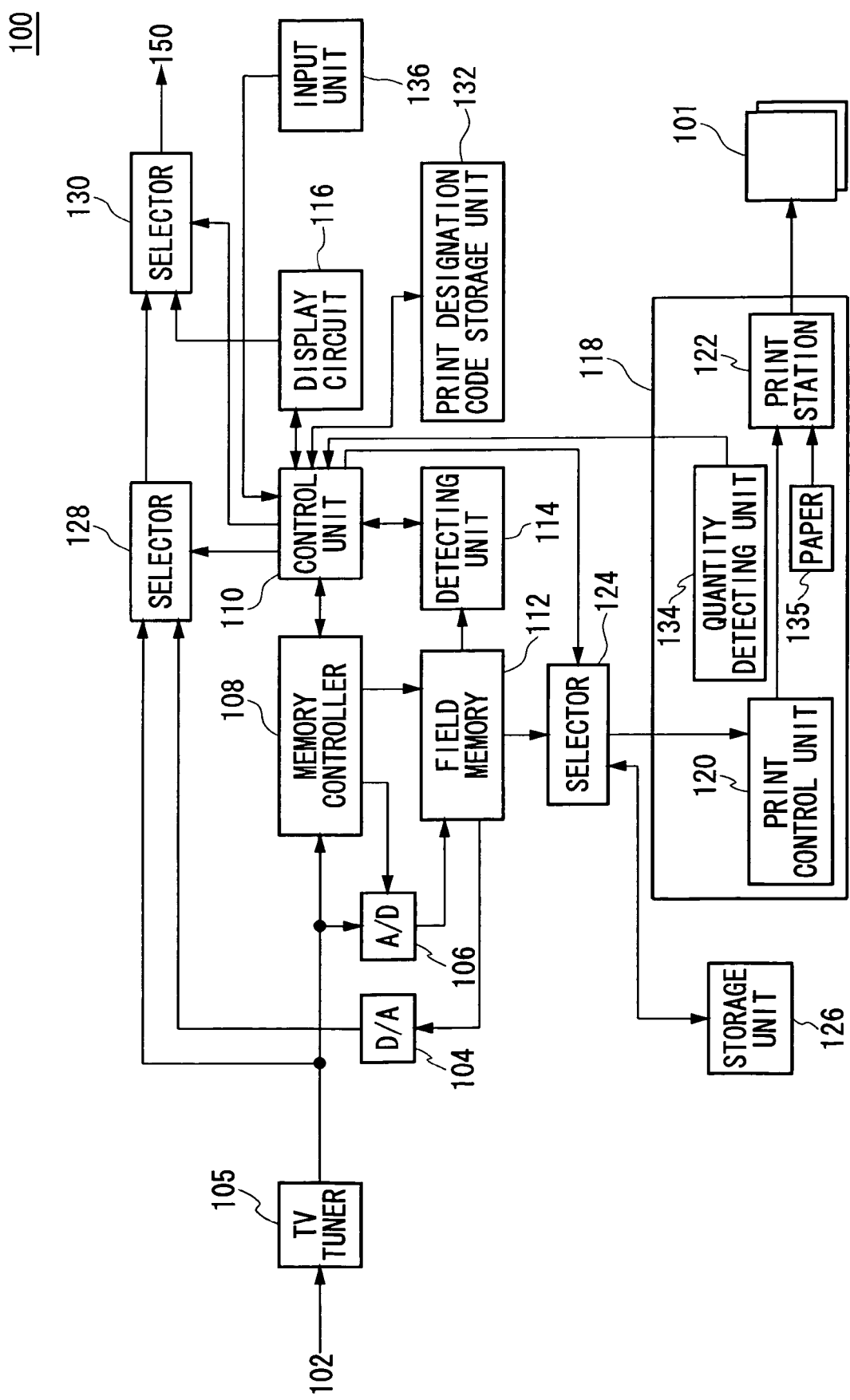
FIG. 3 is a functional block diagram of the printing apparatus of the present embodiments.

FIG. 3 is a functional block diagram depicting the printing apparatus 100 according to the present embodiments. The printing apparatus 100 is provided with a TV tuner 105, a D/A converter 104, an A/D converter 106, a memory controller 108, a control unit 110, a field memory 112, a detecting unit 114, a display circuit 116, a printing unit 118, a storage unit 126, a selector 124, a print designation code storage unit 132, selectors 128 and 130, and an input unit 136. The printing unit 118 includes a print control unit 120, a quantity detecting unit 134, and a print station 122.

The TV tuner 105 retrieves a broadcast signal 220 from signals provided by the aerial 102 and outputs the signal to the memory controller 108, the A/D converter, and the selector 128. The memory controller 108 outputs to the A/D converter, the timing for converting the broadcast signals to digital signals, based on horizontal synchronized signals and vertical synchronized signals carried on the broadcast signals 220. Also, the memory controller 108 outputs an address for storing the broadcast signals digitalized by the A/D converter, to the field memory 112, based on horizontal synchronized signals and vertical synchronized signals. The field memory 112 stores the digital signals provided by the A/D converter, to the address provided by the memory controller 108. Therefore, the field memory 112 can store image data, print request signals, and category codes.

Also, the memory controller 108 outputs the address in the field memory 112, which stores the additional information 10, to the control unit 110, when the memory controller detects a vertical blanking interval. The control unit 110 outputs the address where the additional information 10 is stored, to the detecting unit 114. The detecting unit 114 detects a print request signal and a category code, from the additional information 10 stored in the field memory 112, and outputs the detected signal and the code to the control unit 110.

The print designation code storage unit 132 stores category codes previously designated for printing by a user. When a print request signal is provided by the detecting unit 114 and the category code provided by the detecting unit 114 coincides with the category code stored in the print designation code storage unit 132, the control unit 110 instructs the printing unit 118 to print out the image data stored in the field memory 112. When the printing unit prints out the image data, the selector 124 outputs the image data stored in the field memory 112 to the print control unit 120. The print control unit 120 controls the print station 122 based on the image data. The print station prints out the image onto paper 135 and outputs the printed paper 101.

The quantity detecting unit 134 detects the quantity of paper 135 of the printing unit 118 and outputs the quantity of paper 135 to the control unit 110. If paper 135 is not available, the control unit 110 instructs the storage unit 126 to store the image data that should be printed. For example, the storage unit 126 can be a magnetic recording medium such as a hard disk or a floppy disk, an optical disk such as a CD-R or a DVD, or a memory such as a DRAM, an SRAM, or a nonvolatile memory. By setting the storage unit 126, a user can save a desired screen image even if paper 135 becomes unavailable.

Also, in another embodiment, the print designation code storage unit 132 may respectively add a priority order for storing a plurality of category codes, may instruct the printing unit 118 to print out a screen image having a high order of priority, and may instruct the storage unit 126 to store a screen image having a low order of priority. By adding a priority order to category codes, wasting of paper 135 can be prevented.

The display circuit 116 generates signals for displaying on the monitor 150, setting screen pages such as a screen page for selecting a category code to pre-store in the print designation code storage unit 132, and outputs the signals to the selector 130. The selector 130 outputs a signal from the display circuit 116 to the monitor 150. The input unit 136 inputs instructions from a user. For example, a user looks at the screen page for selecting a category code displayed by the display circuit 116 and inputs a selected category code using the input unit 136. For example, the input unit 136 can be an X-Y coordinate input device for inputting a coordinate value by moving a pointer displayed on the monitor 150 using a device such as a joystick or a mouse, or can be a device such as a keyboard for inputting a given code.

The selector 128 outputs to the selector 130, either a screen image converted to analog signals by the D/A converter 104 or a broadcast signal 220. When the monitor 150 displays a screen image stored in the field memory 112, the control unit 110 instructs the selector 128 to select signals provided by the D/A converter 104. When the monitor 150 displays broadcast signals 220, the control unit 110 instructs the selector 128 to select broadcast signals 220. The selector 130 selects signals provided by the selector 128 or the display circuit 116 and outputs the selected signals to the monitor 150.

Figure 4:
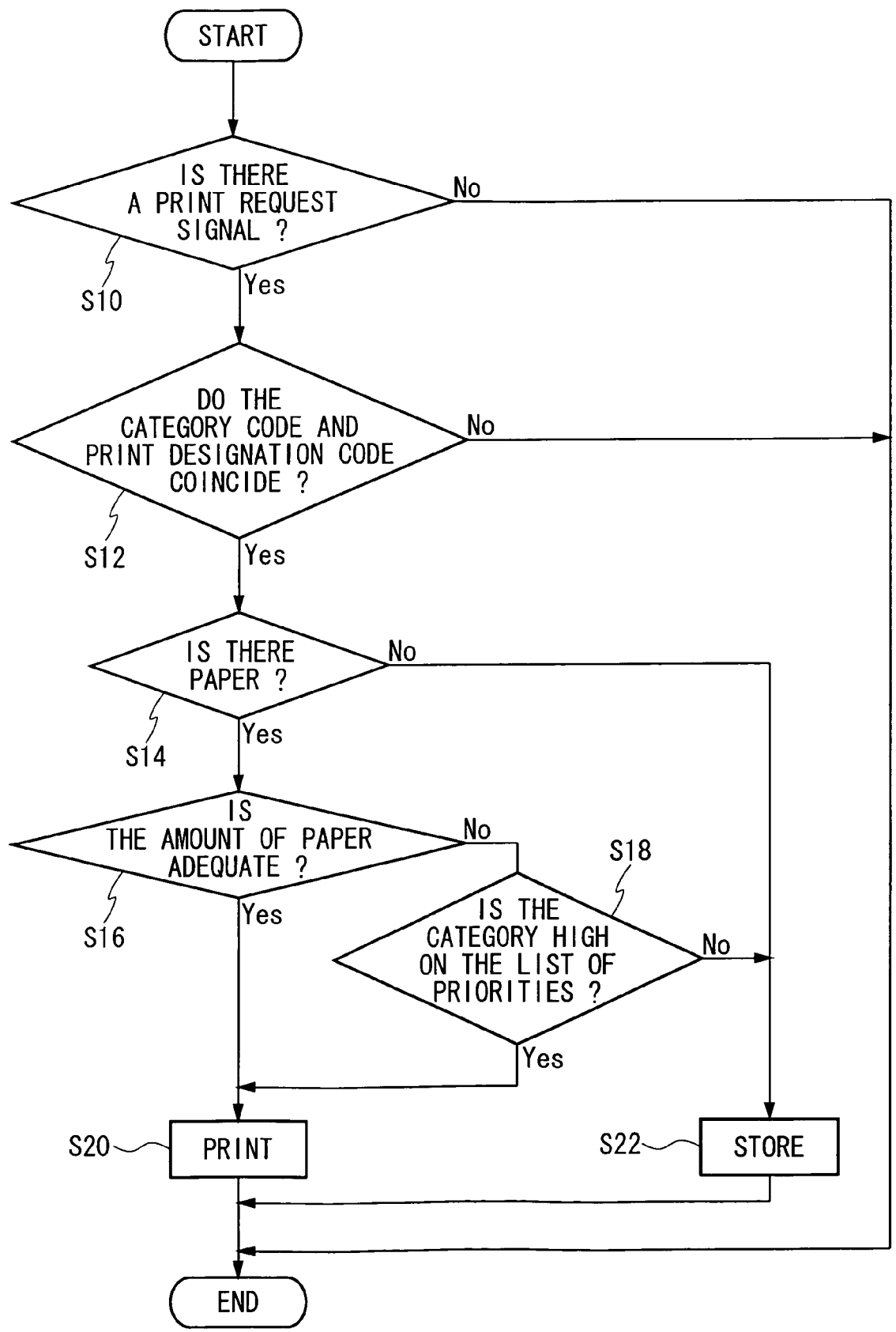
FIG. 4 is a flowchart showing the action of the printing apparatus of the present embodiments.

FIG. 4 shows a flowchart of the printing apparatus 100 of the present embodiments. The printing processing starts when a vertical blanking interval begins. First, the printing apparatus 100 detects whether or not there is a print request signal in the broadcast signal 220 in the step S10. If there is a print request signal, the printing apparatus 100 judges whether or not the category code carried on the broadcast signal 220 coincides with the category code stored previously in the print designation code storage unit 132 in the step S12. If the category code carried on the broadcast signal 220 coincides with the category code stored previously in the print designation code storage unit 132, the printing apparatus 100 detects whether or not the printing unit 118 has paper 135 in the step S14. If there is paper 135, the printing apparatus 100 detects whether or not there is more than a given amount of paper 135 in the step S16. If there is more than a given amount of paper 135, the printing apparatus 100 prints out a screen image onto paper 135 in the step S20.

In the step S10, if there is no print request signal, the printing apparatus 100 finishes the processing and waits until the next vertical blanking interval starts. In the step S12, if the category code carried on the broadcast signals 220 does not coincide with the category code stored previously in the print designation code storage unit 132, the printing apparatus 100 finishes the processing and waits until the next vertical blanking interval starts. In the step S14, if paper 135 is unavailable, the printing apparatus 100 stores the image data in the storage unit 126 shown in FIG. 3 in the step S22. In the step S16, if there is less than a given amount of paper 135, the printing apparatus 100 judges whether or not the order of priority of the category code is high in the step S18. If the order of priority is high, the printing apparatus 100 prints out the screen image in the step S20. If the order of priority is low, the printing apparatus 100 stores the image data in the storage unit 126 shown in FIG. 3 in the step S22.

Figure 5:
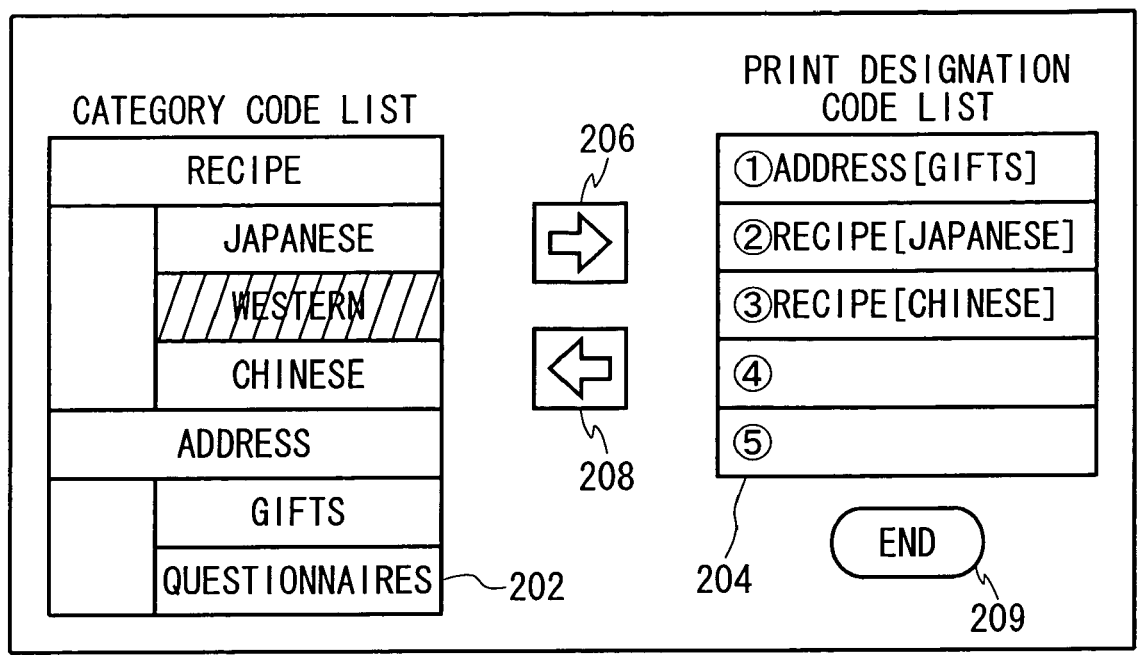
FIG. 5 shows an exemplary screen page to be displayed on the monitor.

FIG. 5 shows an exemplary screen page to be displayed on the monitor 150, by the signals provided by the display circuit 116. FIG. 5 also shows an exemplary screen page for selecting a category code to pre-store in the print designation code storage unit 132 shown in FIG. 3. This selection screen page includes a category code list 202, a print designation code list 204, a setting command button 206, a delete command button 208, and an end command button 209. In the category code list 202, all of the category codes that are placed to the broadcast signal 220 are displayed. For example, these category codes may be stored previously in the control unit 110 and may automatically update using the broadcast signal 220. The category code list 202 shown in FIG. 5 displays by classifying the category codes into a cooking recipe and an address. The recipe, which is a category code, is further classified into Japanese, Western, and Chinese cuisine. The address, which is also a category code, is further classified into gifts and questionnaires.

In the print designation code list 204, category codes stored in the print designation code storage unit 132 are displayed. It is preferable that the print designation code list 204 be displayed by associating the priority order with the category codes. In the print designation code list 204 shown in FIG. 5, the numbers show the priority order, and the letters such as gifts show category codes. This example shows that the category codes of gifts, Japanese, and Chinese are set in the order of highest priority.

For example, if a user selects Western cuisine using the input unit 136 shown in FIG. 3, the selected category code will be emphasized by marking with diagonal lines, as in FIG. 5. If a user selects the setting command button 206, Western cuisine will be newly stored as a category code in the print designation code storage unit 132, as well as being displayed in the print designation code list 204. If a user selects the end command button 209, the processing for storing a category code in the print designation code storage unit 132 will be finished. If a user deletes a category code stored in the print designation code storage unit 132, the user selects the category code that he or she wants to delete from the print designation code list 204 and selects the delete command button 208. By selecting the delete command button 208, a category code stored in the print designation code storage unit 132 will be deleted.

Screen images that a user wants to copy can be printed out by placing a print request signal and a category code on the broadcast signal 220 and printing out the screen image, when the category code carried on the broadcast signal 220 coincides with the pre-stored category code.

As is obvious from the explanations above, given contents carried on broadcast signals can be printed out by the present invention.

Although the present invention has been described by way of exemplary embodiments, it should be understood that those skilled in the art might make many changes and substitutions without departing from the spirit and the scope of the present invention, which is defined only by the appended claims. Those changes and substitutions will be described in the following.

As the first example of the changes and substitutions, information relating to the screen image may be printed out onto paper 135, in addition to the image designated by a print request signal. For example, information relating to the screen image may be information such as the category code, the channel, and the broadcast time.

As the second example of the changes and substitutions, the printing apparatus 100 may store all of the screen images whose category code coincides with the category code stored in the print designation code storage unit 132 and may print out only the images selected by a user from the stored images. In this case, the display circuit 116 instructs the monitor 150 to display the whole list of the screen images stored in the storage unit 126. A user selects a screen image for printing using the input unit 136, while looking at the screen page displaying the whole list.

As the third example of the changes and substitutions, the printing apparatus 100 may print out screen images according to user's preferences. The printing apparatus 100 may be able to print out screen images designated by a user using the input unit 136 and may learn the preferences of a user based on the category codes of the printed images. By learning the preferences of a user, screen images understood to be a user's preference can be printed out onto paper 135 or image data understood to be a user's preference can be stored in the storage unit 126.

FIG. 6 shows the category codes designated by a user for printing and the number of times the respective category code was printed. In FIG. 6, category codes are classified into category code 1, category code 2 . . . For example, it is preferable that a category code be classified into a plurality of category codes and be classified from a broad classification range to a narrow classification range. When a user designates an image for printing, the control unit 110 detects the category code of the designated image and counts every time the control unit 110 detects a category code. The control unit 110 stores a category code based on the number of prints. It can be understood that with respect to a category code, the higher the printing frequency is, the more a user prefers that category.

As the fourth example of the changes and substitutions, a screen image may be printed out by detecting a print request signal and a category code carried on digital broadcast signals, which send picture signals put into codes.

As the fifth example of the changes and substitutions, a screen image may be printed out onto paper 135 based on the print request signal and the category code stored in a picture recording medium such as video tape, which records picture signals.

As the sixth example of the changes and substitutions, the printing apparatus 100 may include a mean for receiving broadcast signals, which are sent using a cable such as cable television, and may receive contents such as image information and character information on which print request signals sent through a cable are placed. Moreover, the printing apparatus 100 may include a mean for connecting to the Internet and may receive contents such as image information and character information on which print request signals sent through the Internet are placed.

What is claimed is:

1. A printing apparatus for printing out contents to be displayed on a monitor and carried on broadcast signals onto paper, comprising:

a receiving unit for receiving the broadcast signals including contents;

a detecting unit for detecting the contents from the broadcast signal received by said receiving unit based on an order of priority which a user sets;

a selector for selecting printing contents from the received contents according to the order of priority and allows said printing contents to be printed; further comprising a print judging unit for instructing said printing unit to print a designated contents when a print designation code for designating the category of pre-stored designated contents coincides with a category code for specifying the category of said designated contents carried on the broadcast signals; and a quantity detecting unit for detecting the quantity of the paper set in the printing apparatus, and wherein said print judging unit stores therein a plurality of said print designation codes, which are respectively listed in order of priority, and instructs said printing unit to print said designated contents with a highest order of the priority when the quantity of the paper becomes adequate.

2. The printing apparatus as claimed in claim 1, further comprising:

a storage unit for storing the data of said designated contents, wherein said print judging unit stores the data of said designated contents in said storage unit when the paper becomes unavailable.

3. A printing apparatus for printing out contents to be displayed on a monitor and carried on broadcast signals onto paper, comprising:

a receiving unit for receiving the broadcast signals including contents;

a detecting unit for detecting the contents from the broadcast signal received by said receiving unit based on an order of priority which a user sets; and a selector for selecting printing contents from the received contents according to the order of priority and allows said printing contents to be printed, wherein the broadcast signals include a category code for specifying the category of said designated contents, further comprising a print judging unit for storing said category code of said designated contents in association with the frequency that a designated contents of said category code is printed, and instructing said printing unit to print said designated contents of said category code occurring more frequently than a predetermined threshold.

4. A printing apparatus for printing out contents to be displayed on a monitor and carried on broadcast signals onto paper, comprising:
- a receiving unit for receiving the broadcast signals including contents;
- a detecting unit for detecting the contents from the broadcast signal received by said receiving unit based on an order of priority which a user sets;
- a print judging unit for instructing said printing unit to print said designated contents when a print designation code for designating the category of pre-stored designated contents coincides with a category code for specifying the category of said designated contents carried on the broadcast signals; and
- a quantity detecting unit for detecting the quantity of the paper set in the printing apparatus, and wherein said print judging unit stores therein a plurality of said print designation codes, which are respectively listed in order of priority, and instructs said printing unit to print said designated contents with a highest order of the priority when the quantity of the paper becomes adequate
- a selector for selecting printing contents from the received contents according to the order of priority and allows said printing contents to be printed, wherein the printing apparatus prints out a designated contents and information relating to said designated contents, onto the paper.

5. A printing apparatus for printing out contents to be displayed on a monitor and carried on broadcast signals onto paper, comprising:
- a receiving unit for receiving the broadcast signals including contents;
- a detecting unit for detecting the contents from the broadcast signal received by said receiving unit based on an order of priority which a user sets;
- a print judging unit for instructing said printing unit to print a designated contents when a print designation code for designating the category of pre-stored designated contents coincides with a category code for specifying the category of said designated contents carried on the broadcast signals;
- a quantity detecting unit for detecting the quantity of the paper set in the printing apparatus, and wherein said print judging unit stores therein a plurality of said print designation codes, which are respectively listed in order of priority, and instructs said printing unit to print said designated contents with a highest order of the priority when the quantity of the paper becomes adequate; and
- a selector for selecting printing contents from the received contents according to the order of priority and allows said printing contents to be printed, further comprising a control unit for combining information showing the contents of said designated contents in said designated contents wherein said printing unit prints out an image, which is combined by said control unit with information showing the contents of said designated contents.

6. A method of printing out designated contents carried on broadcast signals onto paper, comprising:
- detecting a signal designating for printing said designated contents, said signal being carried on the broadcast signals; and
- if said signal is detected at said detecting, a printing apparatus prints said designated contents onto paper according to a user set priority, further comprising print judging for instructing said printing to print said designated contents when a category code for specifying the category of said designated contents, carried on the broadcast signals, coincides with a print designation code designated previously,
- wherein an order of priority of printing is determined for each of a plurality of print designation codes, further comprising detecting the quantity of the paper set in a printing apparatus, wherein said judging instructs said printing unit to print said designated contents with a highest order of priority when the quantity of the paper reaches a given amount.

7. The printing method as claimed in claim 6, further comprising: detecting the quantity of the paper set in a printing apparatus; and
storing data of said designated contents,
wherein said print judging stores data of said designated contents at said storing when the paper becomes unavailable.

8. The printing method as claimed in claim 6, wherein:
the broadcast signals include said category code for specifying the category of said designated contents, the printing method further comprising:
storing said category code of said designated contents printed at said printing in association with the frequency that said designated contents of said category code is printed; and
instructing said printing to print said designated contents of said category code occurring more frequently than a predetermined threshold.

9. The printing method of claim 6, wherein said printing prints said designated contents and information relating to said designated contents.

10. A printing apparatus for printing out contents to be displayed on a monitor and carried on broadcast signals onto paper, comprising:
- a receiving unit for receiving the broadcast signals including contents;
- a detecting unit for detecting the contents from the broadcast signal received by said receiving unit based on an order of priority which a user sets;
- a print judging unit for instructing said printing unit to print said designated contents when a print designation code for designating the category of pre-stored designated contents coincides with a category code for specifying the category of said designated contents carried on the broadcast signals;
- a quantity detecting unit for detecting the quantity of the paper set in the printing apparatus, and wherein said print judging unit stores therein a plurality of said print designation codes, which are respectively listed in order of priority, and instructs said printing unit to print said designated contents with a highest order of the priority when the quantity of the paper becomes adequate; and
- a selector for selecting printing contents from the received contents according to the order of priority and allows said printing contents to be printed, wherein said contents are categorized into a plurality of kinds of character or image information to be displayed on the monitor.

* * * * *